(12) United States Patent
Maucher et al.

(10) Patent No.: US 7,762,917 B2
(45) Date of Patent: Jul. 27, 2010

(54) TORQUE-FILLING POWER TRANSFER ASSEMBLY FOR A MANUAL TRANSMISSION

(75) Inventors: Edmund Maucher, Jeromesville, OH (US); Jeffrey Hemphill, Copley, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 598 days.

(21) Appl. No.: 11/796,370

(22) Filed: Apr. 27, 2007

(65) Prior Publication Data

US 2007/0254763 A1 Nov. 1, 2007

Related U.S. Application Data

(60) Provisional application No. 60/796,481, filed on May 1, 2006.

(51) Int. Cl.
*F16H 47/06* (2006.01)
(52) U.S. Cl. .......................... 475/36; 74/718
(58) Field of Classification Search .............. 475/36, 475/47, 53, 54, 55, 56, 311, 314, 315, 316; 192/3.27; 74/718
See application file for complete search history.

(56) References Cited

U.S. PATENT DOCUMENTS 2,682,786 A * 7/1954 Flinn ........................ 475/36

2002/0082134 A1 * 6/2002 Hirt et al. ................... 477/3
2004/0093972 A1 5/2004 Gumpoltsberger et al.

FOREIGN PATENT DOCUMENTS

DE 3700380 8/1987
DE 19629496 1/1997
FR 1317528 5/1963

\* cited by examiner

*Primary Examiner*—Sherry L Estremsky
*Assistant Examiner*—Edwin A. Young
(74) *Attorney, Agent, or Firm*—Simpson & Simpson, PLLC

(57) ABSTRACT

The present invention broadly comprises a power transmitting assembly for a vehicle, including a transmission power output for a manual transmission in the vehicle and a torque-filling element. The torque-filling element is arranged for connection to an engine in the vehicle, is connected to the transmission power output and is arranged to modify engine torque from the engine and to provide the modified engine torque to the transmission power output during a shift to a gear in the manual transmission. The torque-filling element includes a hydrodynamic torque-transmitting device, a rotation adjustment element to modify rotational speed associated with the engine, and a coupling element to interface the engine torque with torque on the transmission power output. In some aspects, the rotation adjustment element is arranged for connection to the engine. In some aspects, the coupling element is arranged for connection to the engine.

20 Claims, 3 Drawing Sheets

TORQUE-FILLING POWER TRANSFER ASSEMBLY FOR A MANUAL TRANSMISSION

CROSS-REFERENCE TO RELATED APPLICATIONS

This application claims the benefit under 35 U.S.C. §119 (e) of U.S. Provisional Application No. 60/796,481 filed May 1, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a power transmitting assembly to provide fill-in torque during a gear shift in a manual transmission. Specifically, the assembly uses a hydrodynamic component to interface engine and transmission torques.

BACKGROUND OF THE INVENTION

During the typical gear shifting operation in a manual transmission, the transmission is at least partially disconnected from the engine in the vehicle providing torque to the transmission. That is, torque interruptions occur during the gear shift. Unfortunately, these interruptions can result in undesirable lurching or other sensations in the vehicle. Engine power can be supplied to the transmission through mechanical clutches, for example, clutch packs, to provide fill-in torque to at least minimize the torque interruptions. Unfortunately, the operation of the clutches generates significant amounts of heat that may require extensive modification of cooling systems for the drive train in the vehicle.

Thus, there is a long-felt need for a more thermally efficient means of providing fill-in torque to a manual transmission during a gear shift in the transmission.

BRIEF SUMMARY OF THE INVENTION

The present invention broadly comprises a power transmitting assembly for a vehicle, including a transmission power output for a manual transmission in the vehicle and a torque-filling element. The torque-filling element is arranged for connection to an engine in the vehicle, is connected to the transmission power output, is arranged to modify engine torque from the engine, and is arranged to provide the modified engine torque to the transmission power output during a shift to a gear in the manual transmission. The torque-filling element includes a hydrodynamic torque-transmitting device. The torque-filling element includes a rotation adjustment element arranged to modify rotational speed associated with the engine and a coupling element arranged to interface the engine torque with torque on the transmission power output. In some aspects, the engine is arranged to rotate at a speed and the rotation adjustment element is arranged to multiply the speed.

In some aspects, the rotation adjustment element is arranged for connection to the engine and has an output connected to the coupling element. The coupling element is arranged to transmit the modified engine torque to the transmission power output. In some aspects, the rotation adjustment element is arranged to controllably connect the engine and the coupling element. The manual transmission includes a housing, and in some aspects, the rotation, adjustment element includes a brake and a first planetary gear set with a sun gear. The brake is connected to the sun gear and is arranged to ground the sun gear to controllably connect the engine and the coupling element. In some aspects, the coupling element includes a first connection element connected to the rotation adjustment element and the coupling element and arranged to rotationally connect the coupling element and the rotation adjustment element. In some aspects, the first connection element is a clutch. The clutch can be hydraulically-actuated or mechanically-actuated.

In some aspects, the coupling element is arranged for connection to the engine and has an output connected to the rotation adjustment element. The rotation adjustment element is arranged to provide the modified engine torque to the transmission power output. The assembly includes a second connection element arranged for connection to the engine, connected to the coupling element, and arranged to rotationally disconnect the coupling element from the engine. In some aspects, the second connection element is a clutch. The clutch can be hydraulically-actuated or mechanically-actuated.

In some aspects, the coupling element is a torque converter or a fluid coupler and, a fluid coupler gear. In some aspects, the rotation adjustment element is a planetary gear set or at least one gear and at least one chain.

In some aspects, the torque-filling element includes an output shaft arranged to transmit the modified engine torque and an output gear connected to the torque-filling element output shaft. The transmission power output includes a transmission output shaft and the output gear is arranged to rotationally connect the torque-filling element output shaft and the transmission output shaft. In some aspects, the torque-filling element includes a transmission connection element connected to the manual transmission, arranged for connection to the engine, and arranged to rotationally disconnect the manual transmission from the engine during at least a portion of the shift to a gear in the manual transmission. The engine comprises a crankshaft, the manual transmission comprises an input shaft, and the transmission connection element includes a flywheel connected to the crankshaft and a third clutch connected to the flywheel and the input shaft. The clutch can be hydraulically-actuated or mechanically-actuated.

The present invention also broadly comprises a power transmitting assembly for a vehicle, including a flywheel connected to an engine in the vehicle, a planetary gear set with a planetary carrier connected to the flywheel and with a sun gear grounded to a case for a manual transmission in the vehicle, and a torque converter with a pump clutch and a cover connected to a ring gear for the planetary gear set. The assembly also includes an output gear connected to an output shaft for the torque converter and connected to an output gear for the manual transmission and a transmission clutch connected to an input shaft for the transmission and to the flywheel. The planetary gear set is arranged to increase a speed at which the engine is rotating, the pump clutch is arranged to close during a gear shift in the manual transmission assembly, and the transmission clutch is arranged to disengage the input shaft for the transmission and the flywheel during at least a portion of the gear shift in the manual transmission.

The present invention further broadly comprises a power transmitting assembly for a vehicle, including a flywheel connected to an engine in the vehicle, a planetary gear set with a planetary carrier connected to the flywheel and with a sun gear, and a brake connected to the sun gear. The assembly also includes a torque converter impeller connected to a ring gear for the planetary gear set, an output gear connected to an output shaft for the torque converter and connected to an output gear for the manual transmission, and a transmission clutch connected to an input shaft for the transmission and to the flywheel. The planetary gear set is arranged to increase a speed at which the engine is rotating, the brake is arranged to close during a gear shift in the manual transmission to ground said sun gear with a case for said manual transmission to transmit torque through said ring gear, and the transmission clutch is arranged to disengage the input shaft for the transmission and the flywheel during at least a portion of the gear shift in the manual transmission.

It is a general object of the present invention to provide a means of providing fill-in torque during a gear shift in a manual transmission.

It is another object of the present invention to provide a means of avoiding torque gaps during a gear shift in a manual transmission.

It is a further object of the present invention to provide a means of providing fill-in torque during a gear shift in a manual transmission using a hydrodynamic torque-transmitting device.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention, belongs. Although any methods, devices or materials similar or equivalent to those described herein can be used in the practice or testing of the invention, the preferred methods, devices, and materials are now described.

Figure 1:
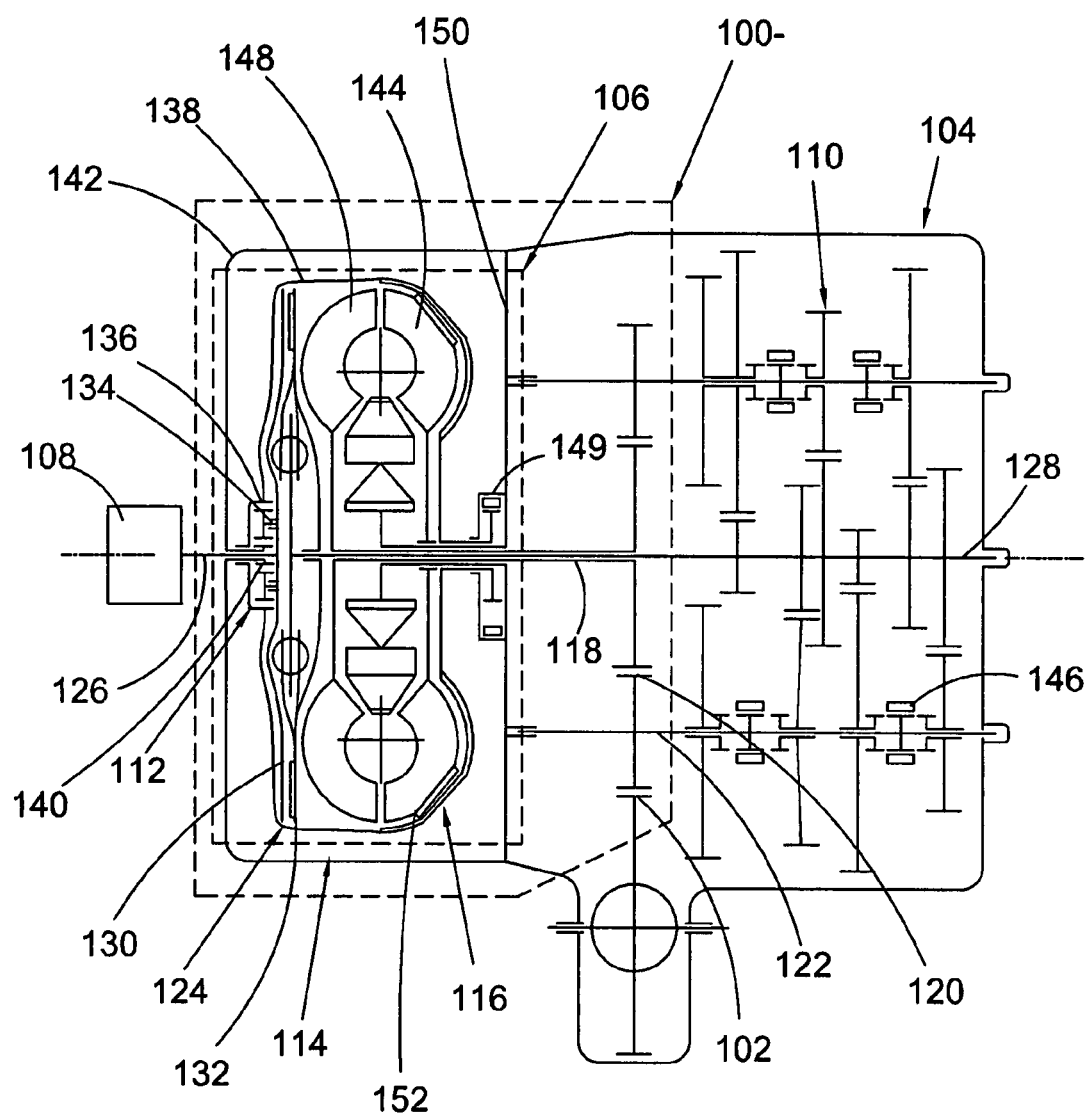
FIG. 1 is a schematic diagram of a present invention power transmitting assembly with a torque converter cover connected a ring gear.

FIG. 1 is a schematic diagram of present invention power transmitting assembly 100 for a vehicle, with a torque converter cover connected to a ring gear. Assembly 100 includes transmission power output 102 for manual transmission 104 in a vehicle (not shown) and torque-filling element 106. Element 106 is arranged for connection to engine 108, is rotationally connected to transmission power output 102, and is arranged to modify engine torque from engine, or drive unit, 108. By rotationally connected, or secured, we mean that the element and the output are connected such that the two components rotate together, that is, the two components are fixed one to the other with respect to rotation. Rotationally connecting two components does not necessarily limit relative movement in other directions. For example, it is possible for two components that are rotationally connected to have axial movement, via a spline connection, with respect to each other. However, it should be understood that rotational connection does not imply that movement in other directions is necessarily present. For example, two components that are rotationally connected can be axially fixed one to the other. The preceding explanation of rotational connection is applicable to the discussions infra. Element 106 also is arranged to transmit the modified engine torque to transmission power output 102 during a shift to a gear, for example, gear 110, in the manual transmission. Torque-filling element 106 includes at least one hydrodynamic torque-transmitting device.

Element 106 includes rotation adjustment element 112 arranged to modify rotational speed associated with engine 108 and coupling element 114 arranged to integrate the engine torque with torque on transmission power output 102. In general, element 114 includes the hydrodynamic torque-transmitting device noted above. In some aspects element 114 is a torque converter. In some aspects (not shown), element 114 is a combination of a fluid coupler and at least one fluid coupler gear. Rotation adjustment element 112 is connected to engine 108 and has an output connected to coupling element 114. In some aspects, element 112 is a planetary gear set. In some aspects (not shown), element 112 is a gear and chain combination. In FIG. 1, coupling element 114 provides the modified engine torque to transmission power output 102. Engine 108 rotates at a certain speed, and in general, element 112 is arranged to multiply the engine speed as further described below.

In some aspects, element 114 includes connection element 116 connected to rotation adjustment element 112 and coupling element 114. When we say a connection element or clutch is connected to first and second items, we mean that functional aspects of the connection element or clutch are located on one or both of the items. That is, element 116 bridges elements 112 and 114. Connection element 116 is arranged to rotationally connect the coupling element and the rotation adjustment element. In some aspects, element 116 is a pump clutch and fluid pressures in torque converter 114 are used to control the operation of the pump clutch as further described below. In some aspects (not shown), connection element 116 is a mechanically-actuated clutch.

Torque-filling element 106 includes output shaft 118 arranged to transmit the modified engine torque. In some aspects, element 106 also includes output gear 120 rotationally connecting output shaft 118 to output shaft 122 of transmission 104.

In some aspects, element 106 includes transmission connection element 124 connected to manual transmission 104 and engine 108 and arranged to rotationally disconnect the manual transmission from the engine during at least a portion of the shift to a gear in the manual transmission, noted above. In some aspects, engine 108 is connected to crankshaft 126 and manual transmission 104 includes input shaft 128. Transmission connection element 124 includes flywheel 130, connected to crankshaft 126, and clutch 132 connected to the flywheel and input shaft 128. In some aspects, clutch 132 is hydraulically-actuated. In some aspects (not shown), clutch 132 is mechanically-actuated.

The operation of assembly 100 is now described in further detail. During "non-shifting" operation of transmission 104, that is, the transmission is operating with a gear engaged, engine torque is transmitted to flywheel 130 and clutch 132 is closed so that engine torque is transmitted from the flywheel to input shaft 128. Planetary carrier 134 in planetary gear set 112 is rotationally connected to the flywheel and ring gear 136 is rotationally connected to cover 138 of the torque converter. Sun gear 140 is grounded to cover 142, therefore, the rotation of carrier 134 is transferred to ring gear 136 and cover 138. However, clutch 116 is open so that impeller 144 in torque converter 114 is not in contact with cover 138 and does not receive engine torque from the cover. Thus, there is no torque output on shaft 118.

At the start of a shift of a gear in the transmission, clutch 132 is opened, disconnecting input shaft 128 from the engine. To ensure that fill-in torque is available to transmission 104 when clutch 132 is opening, clutch 116 is closed prior to or simultaneous with the closing of clutch 132. Thus, element 106 is transmitting torque on output shaft 118 when clutch 132 opens. The shifting of the appropriate gear is then initiated using any means known in the art. In some aspects, since there is no torque on shaft 128 gears can be shifted using claw clutches, for example, clutch 146. Claw clutches are advantageous to use, since claw clutches do not require synchronization and are therefore less complex and expensive.

As noted supra, torque-filling element 106 provides torque to output 102 during the gear shift noted above. There are at least two factors that must be considered regarding fill-in torque. First, engine torque may need to be multiplied in some instances. Second, output torque from element 106 must be rotationally matched with output 102, for example, in some instances, a shaft for the output may be rotating faster than the engine input to element 106. That is, element 106 performs a clutch function. Thus, element 106 receives torque from engine 108 and provides adequate torque to output 102 at a compatible speed. The hydrodynamic torque-transmitting device noted above, for example, torque converter 114, provides hydrodynamic bridging of the shafts and also provides torque multiplication.

The rotational adjustment element, for example, gear set 112, is used to ensure proper input and output speed ratios in torque converter 114. Specifically, to operate in torque conversion mode (to multiply torque from engine 108), the speed of impeller 144 must be greater than the speed of turbine 148. Otherwise, the torque converter fails to multiply input torque (turbine and impeller at the same speed) or operates in "reverse" and acts to brake the engine, resulting in an undesirable loss of engine speed and torque (turbine spinning faster than the impeller). However, in some instances, the speed on shaft 118 may be greater than the speed on crankshaft 126, for example, when transmission 104 is operating in higher gears. Planetary gear set 112 provides the necessary increase in the rotation speed for the impeller. Specifically, since the engine output is connected to carrier 134, gear set 112 is configured so that the rotational speed of ring gear 136, and cover 138, is greater than the carrier and engine speed. Gear set 112 also ensures that the impeller is rotating rapidly enough to provide the torque necessary when transmission 104 is operating in lower gears.

To provide fill-in torque to output 102 during the gear shift, pump clutch 116 is closed so that torque is provided to impeller 144 and torque is generated on output shaft 118. The phasing of the operations of clutches 116 and 132 can be staged so as to avoid any undesirable discontinuities in the power flow to output 102 or transmission 104. Cover 138 is rotationally fixed to crankshaft 126, therefore, the cover is rotating whenever engine 108 is running. This is advantageous, since the inertia of an already-in-motion cover 138 is immediately available at the beginning of a gear shift. That is, it is not necessary to overcome the inertia of a non-moving cover 138 at the start of a gear shift.

When the gear shift in the transmission is completed, clutch 132 is engaged to provide drive unit torque to shaft 128. In some aspects, clutch 116 remains engaged as clutch 132 is closed. That is, drive unit power flows to output 102 through converter 114 and shaft 118 as well as from transmission 104 via shaft 122. By keeping the torque converter in the power circuit, the transition to the newly shifted gear in the transmission is smoothed by the hydrodynamic function of the converter. To complete the shift operation, clutch 116 is opened and torque converter 114 ceases to provide torque on shaft 118. Transmission pump 148 is driven by shell hub 150. Pump 148 charges converter 114 and provides fluid pressure to control clutches 116 and 132 as well as the gear shifts in transmission 104.

Clutches in assembly 100 can be formed in any way known in the art. For example, friction material 152 of pump clutch 116 can be disposed on one or both of impeller 144 and cover 138.

Figure 2:
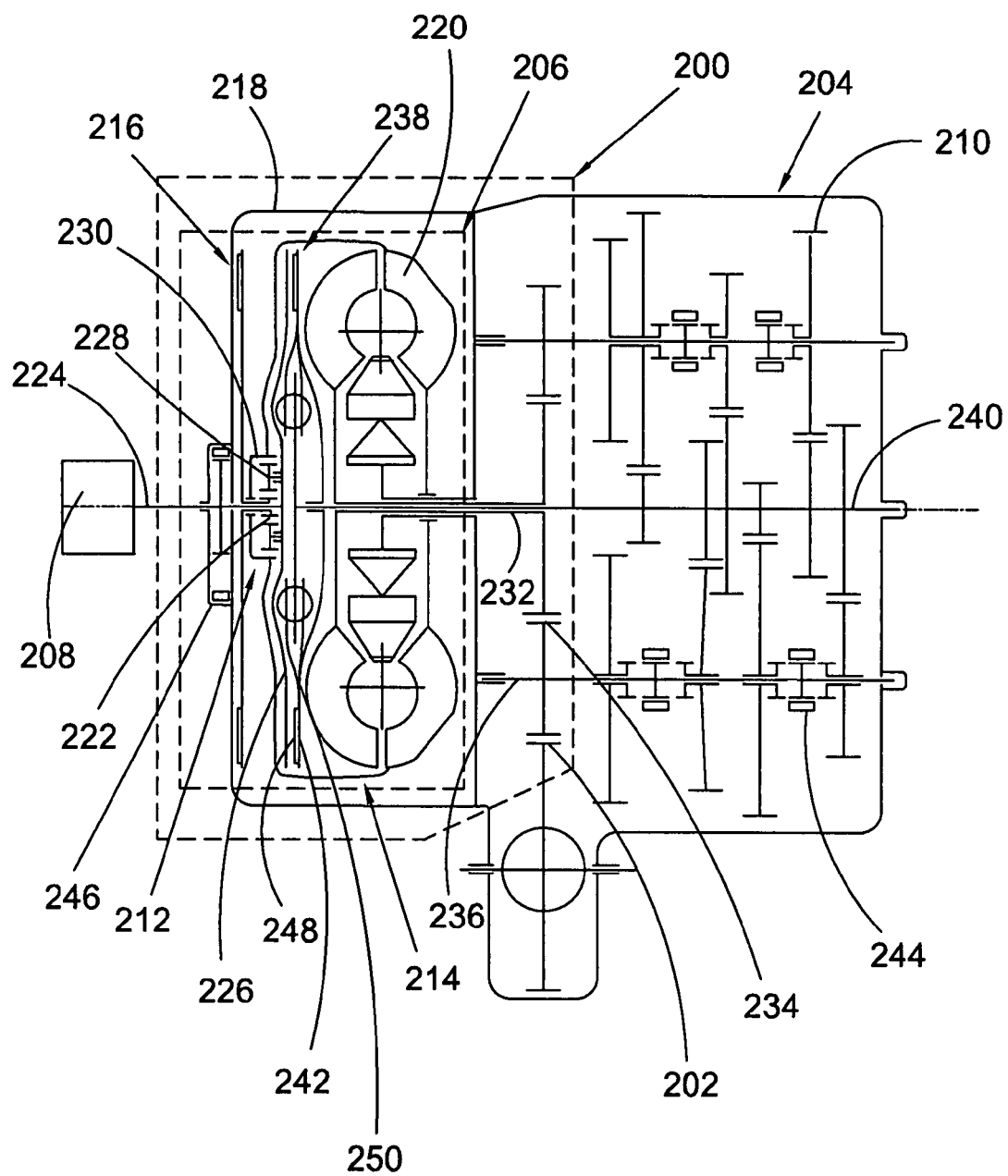
FIG. 2 is a schematic diagram of a present invention power transmitting assembly with a torque converter impeller connected a ring gear; and, FIG. 3 is a schematic diagram of a present invention power transmitting assembly with a mechanically-actuated brake and clutch.

FIG. 2 is a schematic diagram of present invention power transmitting assembly 200 with a torque converter impeller connected a ring gear. Assembly 200 includes transmission power output 202 for manual transmission 204 in a vehicle (not shown) and torque-filling element 206. Element 206 is arranged for connection to engine 208, is rotationally connected to transmission power output 202, and is arranged to modify engine torque from engine, or drive unit, 208. Element 206 also is arranged to transmit the modified engine torque to transmission power output 202 during a shift to a gear, for example, gear 210, in the manual transmission. Torque-filling element 206 includes at least one hydrodynamic torque-transmitting device.

Element 206 includes rotation adjustment element 212 arranged to modify rotational speed associated with engine 208 and coupling element 214 arranged to interface the engine torque with torque on transmission power output 202. In general, element 214 includes the hydrodynamic torque-transmitting device noted above. In some aspects element 214 is a torque converter. In some aspects (not shown), element 214 is a combination of a fluid coupler and at least one fluid coupler gear.

In general, the discussion of elements 106, 112, and 114 in the description of FIG. 1 is applicable to elements 206, 212, and 214, respectively. Rotation adjustment element 212 is connected to engine 208. Element 212 has an output connected to coupling element 214. In some aspects, element 212 is a planetary gear set. In some aspects (not shown), element 212 is a gear and chain combination. Coupling element 214 transmits the modified engine torque to transmission power output 202. Engine 208 rotates at a certain speed, and in general, element 212 is arranged to multiply the engine speed as further described below.

In some aspects, element 206 includes connection element 216 connected to rotation adjustment element 212. Connection element 216 is arranged to engage housing 218 to control the rotation of torque converter 214, specifically, impeller 220. In some aspects, element 216 is a brake connected to sun gear 222 of gear set 212. Engine 208 is connected to crankshaft 224, which is connected to flywheel 226. Flywheel 226 is connected to carrier 228 of gear set 212 and ring gear 230 of the gear set is connected to the impeller. Brake 216 is used to control the operation of torque converter 214 as further described infra. In some aspects, brake 216 is hydraulically-actuated. In some aspects (not shown), connection element 216 is a mechanically-actuated brake.

Torque-filling element 206 includes output shaft 232 arranged to transmit the modified engine torque. In some aspects, element 206 also includes output gear 234 rotationally connecting output shaft 232 to output shaft 236 of transmission 204.

In some aspects, element 206 includes transmission connection element 238 connected to manual transmission 204 and engine 208 and arranged to rotationally disconnect the manual transmission from the engine during at least a portion of the shift to a gear in the manual transmission, noted above. Manual transmission 204 includes input shaft 240. In some aspects, transmission connection element 238 includes flywheel 226, connected to crankshaft 224 and clutch 242 connected to the flywheel and input shaft 240. In some aspects, clutch 242 is hydraulically-actuated. In some aspects (not shown), clutch 242 is mechanically-actuated.

The operation of assembly 200 is now described in further detail. During "non-shifting" operation of transmission 204, engine torque is transmitted to flywheel 226 and clutch 242 is closed so that engine torque is transmitted from the flywheel to input shaft 240. Brake 216 is opened, so that sun gear 222 is no longer grounded to cover 218. Therefore, the rotation of carrier 228 is not transferred to ring gear 230 and impeller 220. Thus, there is no torque output on shaft 232.

At the start of a shift of a gear in the transmission, clutch 242 is opened, disconnecting input shaft 240 from the engine. To ensure that fill-in torque is available to transmission 204 when clutch 242 is opening, clutch 216 is closed prior to or simultaneous with the closing of clutch 242. Thus, element 206 is transmitting torque on output shaft 232 when clutch 242 opens. The shifting of the appropriate gear is then initiated using any means known in the art. In some aspects, since there is no torque on shaft 240, gears in transmission 204 can be shifted using claw clutches, such as clutch 244. Claw clutches are advantageous to use, since claw clutches do not require synchronization and are therefore less complex and expensive.

As noted supra, torque-filling element 206 provides torque to output 202 during the gear shift noted above. That is, element 206 receives torque from engine 208 and provides torque to output 202 at a compatible speed. Further, element 206 acts to bridge or match the torque characteristics of output shaft 232 and shaft 236 (output 202). Torque converter 214 provides hydrodynamic bridging of the shaft and also provides torque multiplication. In the description of FIG. 1, the problem associated with the rotational speed mismatch between the engine and output 102, or, the ratio of the torque converter input and output speeds, was discussed. This discussion is applicable to FIG. 2, and for the sake of brevity is not repeated here.

To provide fill-in torque to output 202 during the gear shift, brake 216 is closed so that the sun gear is grounded and engine torque is transmitted though the carrier and ring gear to impeller 220 and torque is generated on output shaft 232. The phasing of the operations of brake 216 and clutch 242 can be staged so as to avoid any undesirable discontinuities in the power flow to output 202 or transmission 204.

When the gear shift in the transmission is completed, clutch 242 is engaged to provide drive unit torque to shaft 240. In some aspects, brake 216 remains engaged as clutch 240 is closed. That is, drive unit power flows to output 202 through converter 214 and shaft 232 as well as through transmission 204 via shaft 236. By keeping the torque converter in the power circuit, the transition to the newly shifted gear in the transmission is smoothed by the hydrodynamic function of the converter. To complete the shift operation, brake 216 is opened and torque converter 214 ceases to provide torque on shaft 232. Transmission pump 246 is driven by crankshaft 224. Pump 246 charges converter 214 and provides fluid pressure to control brake 216 and clutch 242 as well as the gear shifts in transmission 204.

Clutches or brakes in assembly 200 can be formed in any way known in the art. For example, friction material 248 of clutch 242 can be disposed on one or both of flywheel 226 and plate 250.

Figure 3:
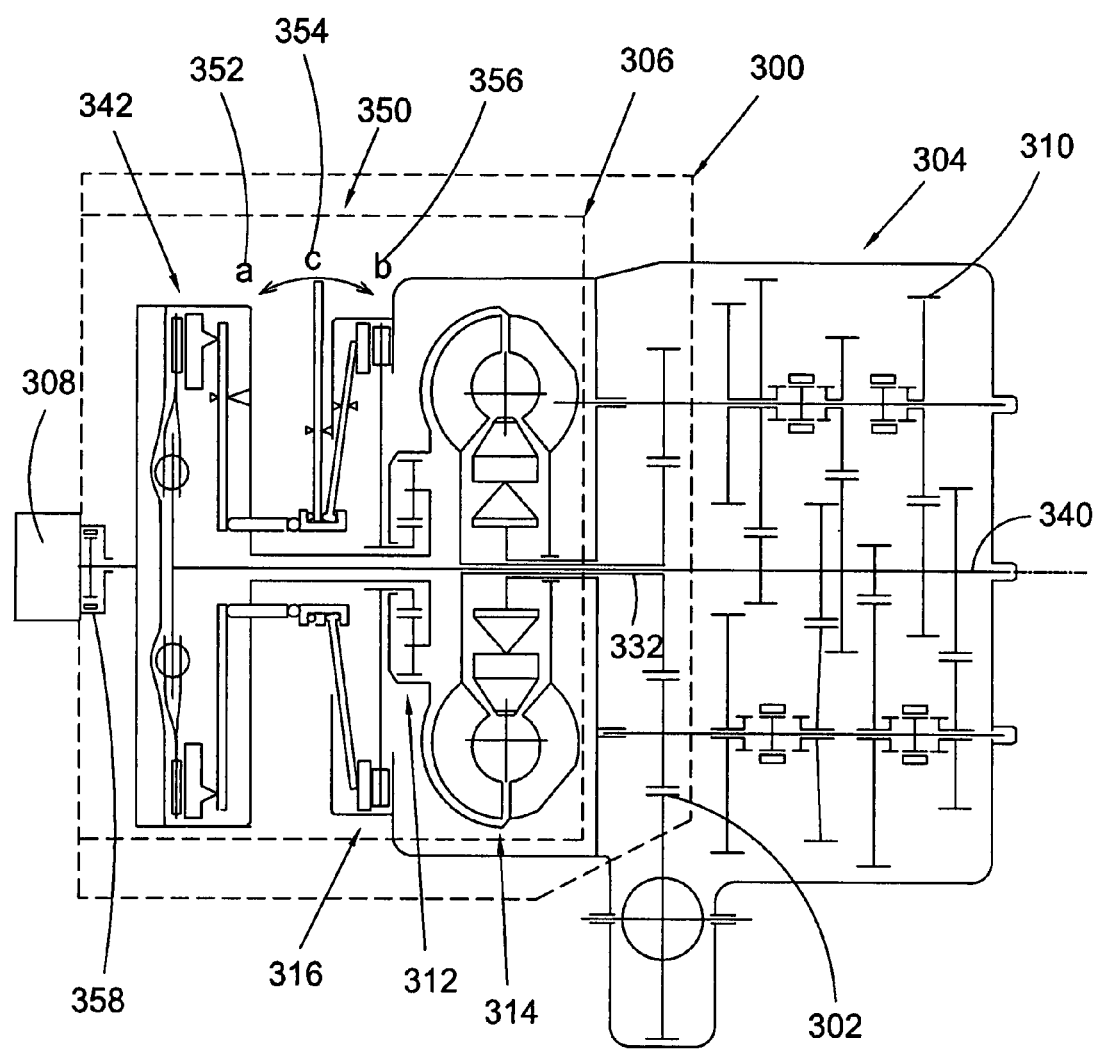

FIG. 3 is a schematic diagram of present invention power transmitting assembly 300 with a mechanically-actuated brake and clutch. Assembly 300 includes transmission power output 302 for manual transmission 304 in a vehicle (not shown) and torque-filling element 306. Element 306 is arranged for connection to engine 308, rotationally connected to transmission power output 302, and arranged to modify engine torque from engine, or drive unit, 308. Element 306 also is arranged to provide the modified engine torque to transmission power output 302 during a shift to a gear, for example, gear 310, in the manual transmission. Torque-filling element 306 includes at least one hydrodynamic torque-transmitting device.

Element 306 includes rotation adjustment element 312 arranged to modify rotational speed associated with engine 308 and coupling element 314 arranged to interface the engine torque with torque on transmission power output 302. In general, element 314 includes the hydrodynamic torque-transmitting device noted above. In some aspects element 314 is a torque converter. In some aspects (not shown), element 314 is a combination of a fluid coupler and at least one fluid coupler gear.

In general, the configuration and operation of assembly 300 is the same as that of assembly 200 in FIG. 2, with the exception that brake 316, analogous to brake 216 in FIG. 2, and clutch 342, analogous to clutch 242 in FIG. 2, are mechanically-actuated rather than hydraulically actuated. Therefore, the discussion in FIG. 2 regarding the operation of element 206, output 202, and transmission 204 is applicable to element 306, output 302, and transmission 304, respectively. In the interest of brevity, only the differences regarding brake 316 and clutch 342 are discussed below.

Control element 350 operates on the brake and clutch as follows. In position 352, clutch 342 is engaged and brake 316 is disengaged. Thus, engine power is being transmitted to input shaft 340, torque converter 314 is not receiving torque or generating torque on output shaft 332. This is analogous to the "non-shifting" operations discussed supra. That is, transmission 304 is operating in gear. In position 354, both the brake and the clutch are engaged. As a result, engine power is being transmitted to input shaft 340 and torque converter 314 is receiving engine torque and generating torque on output shaft 332. This occurs, for example at the beginning or end of a gear shift. In position 356, the brake is engaged and the clutch is disengaged. This occurs, for example, in the middle of a gear shift in transmission 304. Therefore, engine power is no longer being transmitted to input shaft 340 and torque converter 314 is receiving engine torque and generating torque on output shaft 332. Brake 316, clutch 342 and control element 350 can be of any type known in the art. Transmission pump 358 is connected to engine 308.

In some aspects (not shown), the coupling element is connected to the engine and the rotational adjustment element is connected downstream of the coupling element. In these aspects, a connection element is used to controllably connect the coupling element to the engine. For example, using the configuration of FIG. 1 as a starting point, flywheel 130 can be directly connected to cover 138 so that engine torque is directly transmitted to the cover. Then, as discussed in the description of FIG. 1, a pump clutch can be used to activate or deactivate the torque converter. The rotational adjustment element is connected to an output of the coupling element and transmits the output of the power transmitting assembly to the manual transmission power output. As noted in the description of FIG. 1, the rotational mismatch of the engine and the transmission power output must be addressed. In this configuration, rather than using the rotational adjustment element to increase input speed for the coupling element, as is done in FIGS. 1 and 2, the rotational adjustment element is used to increase the output speed of the coupling element.

It should be understood that the present invention is not limited to a particular planetary gear set or torque converter and that any planetary gear set or torque converter known in the art can be used. The present invention also is not limited to use with a particular manual transmission, for example, the present invention is not limited to a transmission having a particular number of gears or lay shafts.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A power transmitting assembly for a vehicle, comprising:
   a transmission power output for a manual transmission in said vehicle; and,
   a torque-filling element including:
      a rotation adjustment element arranged to modify rotational speed associated with said engine; and,
      a coupling element arranged to integrate said engine torque with torque on said transmission power output, the torque-filling element arranged for connection to an engine in said vehicle, connected to said transmission power output, arranged to modify engine torque from said engine, and arranged to provide said modified engine torque to said transmission power output during a shift to a gear in said manual transmission, said torque-filling element comprising a hydrodynamic torque-transmitting device, wherein:
   said engine is arranged to rotate at a speed and said rotation adjustment element is arranged to multiply said speed; and,
   a torque output of the coupling element is transmittable to the transmission power output without passing through shift gears in the transmission.

2. The assembly of claim 1 wherein said rotation adjustment element is arranged for connection to said engine and has an output connected to said coupling element and wherein said coupling element is arranged to transmit said modified engine torque to said transmission power output.

3. The assembly of claim 2 wherein said rotation adjustment element is arranged to controllably connect said engine and said coupling element.

4. The assembly of claim 3 wherein said manual transmission further comprises a housing, said rotation adjustment element further comprises a brake and a planetary gear set with a sun gear, and said brake is connected to said sun gear and is arranged to ground said sun gear to controllably connect said engine and said coupling element.

5. The assembly of claim 2 wherein said coupling element further comprises a connection element connected to said rotation adjustment element and said coupling element and arranged to rotationally connect said coupling element and said rotation adjustment element.

6. The assembly of claim 5 wherein said first connection element is a clutch.

7. The assembly of claim 6 wherein said first clutch is selected from the group consisting of a hydraulically-actuated clutch and a first mechanically-actuated clutch.

8. The assembly of claim 1 wherein said coupling element is arranged for connection to said engine and has an output connected to said rotation adjustment element and wherein said rotation adjustment element is arranged to transmit said modified engine torque to said transmission power output.

9. The assembly of claim 8 further comprising: a connection element arranged for connection to said engine, connected to said coupling element, and arranged to rotationally disconnect said coupling element from said engine.

10. The assembly of claim 9 wherein said connection element is a clutch.

11. The assembly of claim 10 wherein said clutch is selected from the group consisting of a hydraulically-actuated clutch and a mechanically-actuated clutch.

12. The assembly of claim 1 wherein said coupling element comprises a torque converter.

13. The assembly of claim 1 wherein said rotation adjustment element comprises a planetary gear set.

14. The assembly of claim 1 wherein said rotation adjustment element comprises at least one gear.

15. The assembly of claim 1 wherein said torque-filling element further comprises an output shaft arranged to transmit said modified engine torque and an output gear connected to said torque-filling element output shaft, said transmission power output further comprises a transmission output shaft, and said output gear is arranged to rotationally connect said torque-filling element output shaft and said transmission output shaft.

16. The assembly of claim 1 wherein said torque-filling element further comprises a transmission connection element connected to said manual transmission, arranged for connection to said engine, and arranged to rotationally disconnect said manual transmission from said engine during at least a portion of said shift to a gear in said manual transmission.

17. The assembly of claim 16 wherein said engine comprises a crankshaft, said manual transmission comprises an input shaft, and said transmission connection element further comprises a flywheel connected to said crankshaft and a clutch connected to said flywheel and said input shaft.

18. The assembly of claim 17 wherein said clutch is selected from the group consisting of a hydraulically-actuated clutch and a mechanically-actuated clutch.

19. A power transmitting assembly in a vehicle, comprising:
   a flywheel connected to an engine in said vehicle;
   a planetary gear set with a planetary carrier connected to said flywheel and with a sun gear grounded to a case for a manual transmission in said vehicle;
   a torque converter with a pump clutch and a cover connected to a ring gear for said planetary gear set;
   an output gear connected to an output shaft for said torque converter and connected to an output gear for said manual transmission; and, a transmission clutch connected to an input shaft for said transmission and to said flywheel, wherein said planetary gear set is arranged to increase a speed at which said engine is rotating, said pump clutch is arranged to close during a gear shift in said manual transmission, and said transmission clutch is arranged to disengage said input shaft for said transmission and said flywheel during at least a portion of said gear shift in said manual transmission.

20. A power transmitting assembly in a vehicle, comprising:
- a flywheel connected to an engine in the vehicle;
- a planetary gear set with a planetary carrier connected to said flywheel and with a sun gear;
- a brake connected to said sun gear;
- a torque converter impeller connected to a ring gear for said planetary gear set;
- an output gear connected to an output shaft for said torque converter and connected to an output gear for a manual transmission in said vehicle; and,
- a transmission clutch connected to an input shaft for said transmission and to said flywheel, wherein said planetary gear set is arranged to increase a speed at which said engine is rotating, said brake is arranged to close during a gear shift in said manual transmission assembly to ground said sun gear with a case for said manual transmission to transmit torque through said ring gear, and said transmission clutch is arranged to disengage said input shaft for said transmission and said flywheel during at least a portion of said gear shift in said manual transmission.

* * * * *